(12) United States Patent
Chiba

(10) Patent No.: US 7,621,248 B2
(45) Date of Patent: Nov. 24, 2009

(54) INTERNAL COMBUSTION ENGINE

(75) Inventor: Kazuhiko Chiba, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 2 days.

(21) Appl. No.: 11/892,248

(22) Filed: Aug. 21, 2007

(65) Prior Publication Data
US 2008/0053392 A1    Mar. 6, 2008

(30) Foreign Application Priority Data
Aug. 29, 2006    (JP)    ............... 2006-232475

(51) Int. Cl.
*F02M 35/10*    (2006.01)
*F02F 1/42*     (2006.01)
(52) U.S. Cl. ............... 123/184.21; 123/193.5
(58) Field of Classification Search ............ 123/184.21, 123/193.1, 193.3, 193.5, 336, 337, 403, 294–305
See application file for complete search history.

(56) References Cited

U.S. PATENT DOCUMENTS

| | | | |
|---|---|---|---|
| 5,154,154 A * | 10/1992 | Henke et al. ............ | 123/549 |
| 5,186,140 A | 2/1993 | Ueda et al. | |
| 5,522,360 A * | 6/1996 | Suzuki et al. ............ | 123/329 |
| 5,852,994 A * | 12/1998 | Tsuzuku et al. .......... | 123/308 |
| 6,848,408 B1 | 2/2005 | Mendler | |
| 2005/0016487 A1 * | 1/2005 | Ikuma et al. ........... | 123/184.42 |

FOREIGN PATENT DOCUMENTS

| | | |
|---|---|---|
| DE | 44 03 219 A1 | 8/1995 |
| EP | 0 501 612 A2 | 9/1992 |
| JP | 2005-133548 A | 5/2005 |
| KR | 2003-0039467 A | 5/2003 |

* cited by examiner

*Primary Examiner*—Noah Kamen
(74) *Attorney, Agent, or Firm*—Birch, Stewart, Kolasch & Birch, LLP

(57) ABSTRACT

To secure enough of an amount of intake air and an increase in a flow rate in a balanced manner to improve a filling efficiency for increasing power in an internal combustion engine. A combustion chamber is formed between a cylinder block and a cylinder head opposite to a top portion of a piston slidably fitted in the cylinder block. An intake path extends from an inlet pipe, separately or integrally, connected to the cylinder head to the cylinder head and is in communication with an intake valve port that opens to the top surface of the combustion chamber to be opened/closed with the intake valve. Intake paths are provided with a pair of throttle portions arranged with an interval in an air flow direction of the intake paths and an expanding portion positioned between the throttle portions.

11 Claims, 6 Drawing Sheets

INTERNAL COMBUSTION ENGINE

CROSS-REFERENCE TO RELATED APPLICATIONS

The present application claims priority under 35 USC 119 to Japanese Patent Application No. 2006-232475 filed on Aug. 29, 2006 the entire contents of which are hereby incorporated by reference.

BACKGROUND OF THE INVENTION

1. Field of the Invention

The present invention relates to an internal combustion engine wherein a combustion chamber is formed between a cylinder block and a cylinder head opposite to a top portion of a piston that is slidably fitted in the cylinder block. An intake path extends from an inlet pipe, that is separately or integrally connected to the cylinder head, to the cylinder head and communicates with an intake valve port that opens to the top surface of the combustion chamber to be opened/closed with the intake valve.

2. Description of Background Art

Such internal combustion engine is disclosed in, for example, JP-A No. 2005-133548.

In the internal combustion engine as disclosed in JP-A No. 2005-133548, a downward projecting portion is formed on the top surface of an intake path in a mounting position of a fuel injection valve to reduce a fuel spraying space with the fuel injection valve to thereby avoid an abrupt change in the intake path area, a reduction in the flow rate of an intake air, and a reduction in the filling efficiency. To further improve power of the internal combustion engine, it is unnecessary to increase a flow rate as well as to secure an enough quantity of intake air flowing through the intake path.

SUMMARY AND OBJECTS OF THE INVENTION

The present invention has been accomplished in view of the above circumstances. It is accordingly an object of an embodiment of the present invention to provide an internal combustion engine that secures a sufficient quantity of intake air for increasing a flow rate in a balanced manner to improve a filling efficiency to increase power.

To attain the above object, according to an embodiment of the present invention, an internal combustion engine includes a combustion chamber formed between a cylinder block and a cylinder head opposite to a top portion of a piston slidably fitted in the cylinder block with an intake path extending from an inlet pipe that is separately or integrally connected to the cylinder head and communicating with an intake valve port that opens to the top surface of the combustion chamber to be opened/closed with the intake valve. The intake path is provided with a pair of throttle portions arranged with an interval in an air flow direction of the intake path and an expanding portion positioned between the throttle portions.

Further according to an embodiment of the present invention, a fuel injection valve for injecting a fuel to the expanding portion is attached to the cylinder head or the inlet pipe.

Further, according to an embodiment of the present invention, the expanding portion corresponds to a connection portion between the cylinder head and the inlet pipe separate from the cylinder head.

Further, according to an embodiment of the present invention, the throttle portions are provided to a bent portion of the intake path formed in a substantially U-shape in section as viewed in a projected plan orthogonal to an axial line of a crank shaft and parallel to a cylinder axial line.

According to an embodiment of the present invention, a cross-sectional area of the intake path is sequentially changed such as reduced, expanded, reduced, and expanded. Thus, it is possible to increase an intake flow rate due to a reduction in the cross-sectional area and to increase an intake air amount due to expansion in a cross-sectional area in a balanced manner. As a result, filling efficiency is improved to increase power.

Further, according to an embodiment of the present invention, a fuel is injected from the fuel injection valve to the expanding portion of the intake path, so it is possible to suppress a change in the intake air flow rate due to a nozzle arrangement of the fuel injection valve as much as possible.

Further, according to an embodiment of the present invention, even if the cylinder head and the inlet pipe are separate members, the expanding portion corresponds to a connection portion between the cylinder head and the inlet pipe, so a connection port diameter can be set relatively large, and the parts can be easily processed and assembled.

Further, according to an embodiment of the present invention, the intake path can be made compact and a cross-sectional area of the intake path can be largely changed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, the best modes for carrying out the invention will be described based on an embodiment illustrated in the accompanying drawings.

Figure 1:
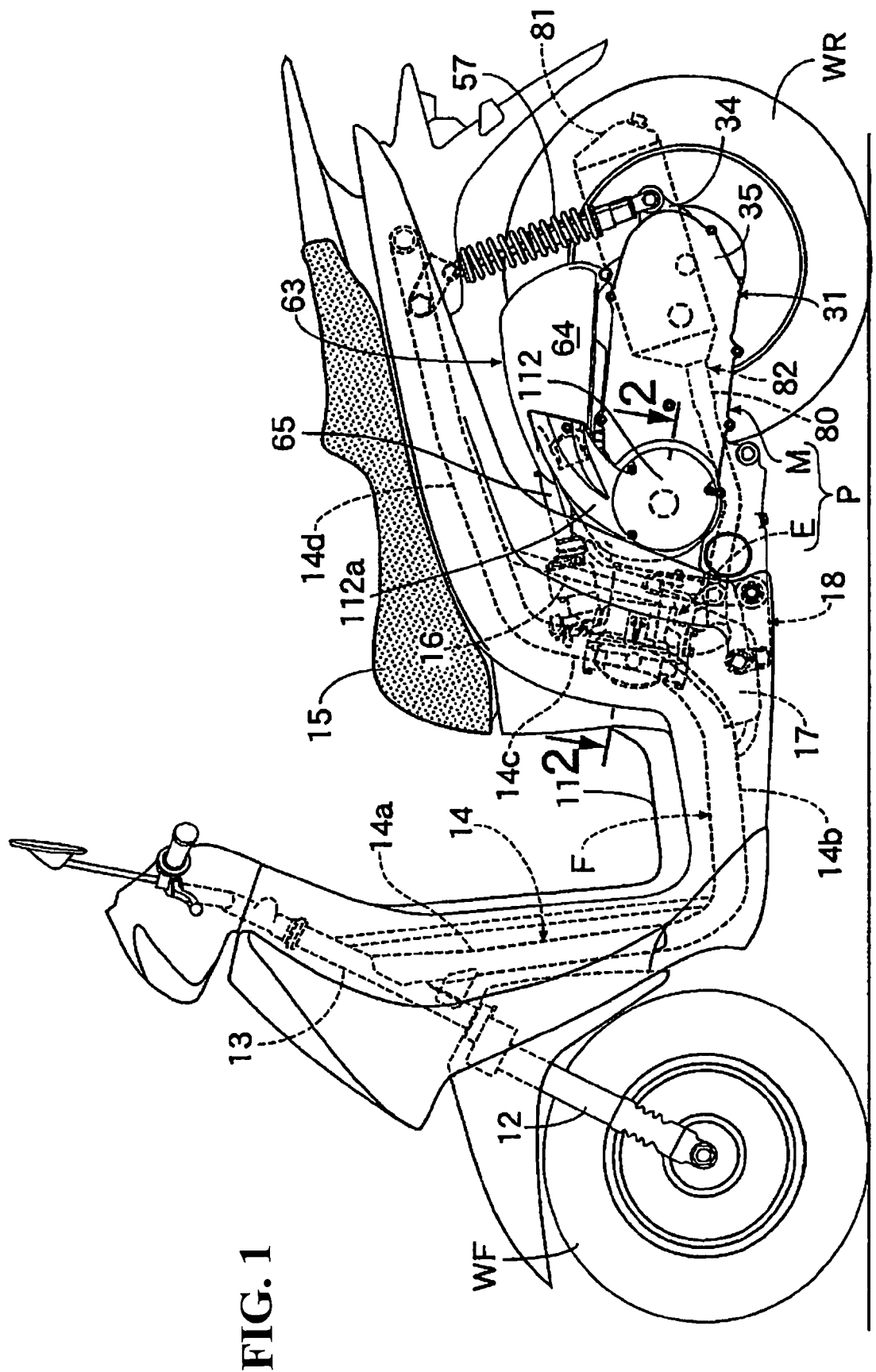
FIG. 1 is a left side view of a scooter type motorcycle.

In FIG. 1, a vehicle body frame F of the scooter type motorcycle having a low floor 11 includes a head pipe 13 steerably supporting front forks 12 axially supporting a front wheel WF, and a pair of right and left side frames 14 joined to the head pipe 13 at the front end portion. The side frame 14 includes a down frame portion 14a suspended from the head pipe 13, a lower frame portion 14b continuous to the lower end of the down frame portion 14a and extending downward below the floor 11 with the rear portion sloped upwardly, and an erecting frame portion 14c continuous to the rear end of the lower frame portion 14b and erecting on the rear side of the floor 11. A seat rail portion 14d extends rearwardly from the rear end of the erecting frame portion 14c to support a seat 15, which are integrally formed. A single pipe is bent to form each part.

Each rear sub frame 16 is provided between a rear portion of each lower frame portion 14b in the side frame 14 and a front portion of each seat rail portion 14d so as to be positioned below each lower frame portion 14b of the side frame 14 and behind each erecting frame portion 14c. Each pivot plate 17 is provided between each side frame 14 and each rear sub frame 16.

In the pivot plates 17 of the vehicle body frame F, a power unit, composed of the engine E placed on the front side of the rear wheel WR and a transmission gear M placed on the left side of the rear wheel WR, is vertically slidably supported through a link mechanism 18. The rear wheel WR is axially supported to the rear portion of the power unit P.

Figure 2:
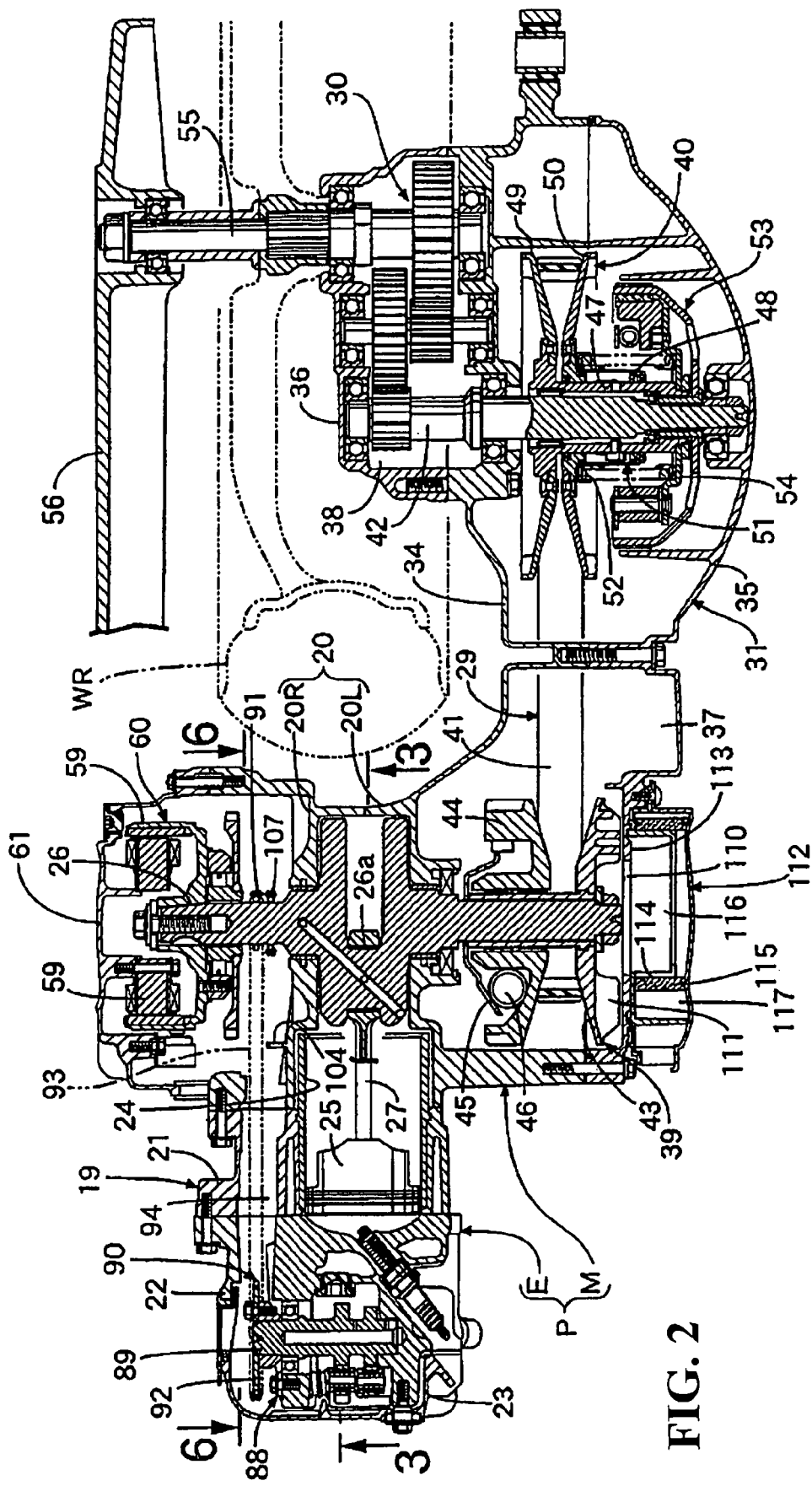
FIG. 2 is an enlarged sectional view taken along the line 2-2 of FIG. 1.

In FIG. 2, an engine main body 19 of the engine E, in this embodiment a single cylinder water-cooled 4-stroke-cycle internal combustion engine, includes a crankcase 20 composed of right and left semi-crankcases 20L and 20R, a cylinder block 21 coupled with the crankcase 20, a cylinder head 22 coupled with the cylinder block 21, and a head cover 23 coupled with the cylinder head 22. A piston 25 is slidably inserted to a cylinder bore 24 formed in the cylinder block 21 with the cylinder axial line slightly tilted in an anterosuperior direction. The crank shaft 26, extending in the width direction of the vehicle body frame F, is rotatably supported on the crankcase 20. The piston 25 is coupled with a crank pin 26a integrated with the crank shaft 26 through a connecting rod 27.

The transmission gear M is composed of a V-belt type continuously variable transmission 29 and a reducing gear train 30 reducing a speed of the continuously variable transmission 29 to transmit the rotational speed to the vehicle shaft of the rear wheel WR. The transmission gear M is accommodated in a transmission case 31 provided to the crankcase 20 and extending on the left side of the rear wheel WR.

The transmission case 31 is composed of an inner case integrally continuous to the left semi-crankcase 20L of the crankcase 20 and extending rearwardly, an outer case 35 covering the inner case 34 from the outside, and a gear case 36 joined to a rear portion of the inner case 34. A transmission chamber 37 for accommodating the V-belt type continuously variable transmission 29 is formed between the inner case 34 and the outer case 35, and a gear chamber 38 for accommodating the reducing gear train 30 is formed between the inner case 34 and the gear case 36.

The V-belt type continuously variable transmission 29 is composed of a drive pulley 39 attached to one end of the crank shaft 26 inserted to the transmission chamber 37 from the crankcase 20, a driven pulley 40 attached to an output shaft 42 rotatably supported by the inner case 34, the outer case 35, and the gear case 36 with the axial line parallel to the crank shaft 26, and an endless V belt 41 transmitting a torque from the drive pulley 39 to the driven pulley 40.

The drive pulley 39 includes a fixed semi-pulley 43 fixed to the crank shaft 26, and a movable semi-pulley 44 that can change a distance from the fixed semi-pulley 43. The movable semi-pulley 44 is driven in the axial direction due to a centrifugal force acting on a weight 46 provided between a lamp plate 45 fixed to the crank shaft 26 and the moveable semi-pulley 44.

Further, the driven pulley 40 includes an internal cylinder 47 coaxially surrounding an output shaft 42 in a relatively rotatable manner with an external cylinder 48 slidably fitting the internal cylinder 47 such that the cylinders are relatively rotatable about and along the axial line. A fixed semi-pulley 49 is fixed to the internal cylinder 47 with a movable semi-pulley 50 fixed to the external cylinder 48 opposite to the fixed semi-pulley 49. A torque cam mechanism 51 is provided between the internal cylinder 47 and the external cylinder 48 to apply a component force in the axial direction between the semi-pulleys 49 and 50 in accordance with a difference in the relative rotational phase between the movable semi-pulley 50 and the fixed semi-pulley 49. A coil spring 52 is provided for elastically biasing the movable semi-pulley 50 toward the fixed semi-pulley 49. The V belt 41 is stretched between the fixed semi-pulley 49 and the movable semi-pulley 50.

A centrifugal clutch 53 for transmitting a torque as the engine rpm exceeds the preset rpm is provided between the internal cylinder 47 of the driven pulley 40 and the output shaft 42. A coil spring 52 surrounding the external cylinder 48 is provided between the drive plate constituting the centrifugal clutch 53 and is coaxially and relatively rotatably joined to the internal cylinder 47 and the movable semi-pulley 50.

A distance between the fixed semi-pulley 49 of the driven pulley 40 and the movable semi-pulley 50 is determined based on a relationship among a force generated by the torque cam mechanism 51 in the axial direction, an elastic force generated by the coil spring 52 in the axial direction, and a force of the V belt 41 acting to increase a distance between the fixed semi-pulley 49 and the movable semi-pulley 50. If the movable semi-pulley 44 is brought close to the fixed semi-pulley 43, a radius of the V belt 41 wound around the drive pulley 39 increases, in the drive pulley 39. Thus, a radius of the V belt 41 wound around the driven pulley 45 is reduced.

One end of the vehicle shaft 55 of the rear wheel WR is inserted into the transmission case 30 after passing through an air-tight opening in the gear case 36. The one end of the vehicle shaft 55 is rotatably supported by the inner case 34 and the gear case 36. In addition, the reducing gear train 30 provided between the output shaft 42 and the vehicle shaft 55 is accommodated in the gear chamber 38.

Further, a swing arm 56 is integrated with the crankcase 20 of the engine main body 19 and is placed on the right side of the rear wheel WR. The other end of the vehicle shaft 55 is rotatably supported to the rear portion of the swing arm 56. As shown in FIG. 1, a rear shock absorber 57 is provided between the rear portion of the inner case 34 of the transmission case 31 and the rear portion of the left-sided seat rail portion 14d in the vehicle frame F.

Further, an outer rotor 58 is fixed to the other end of the crank shaft 26 rotatably passing through the right semi-crankcase 20R of the crankcase 20. An inner stator 59 is surrounded by the outer rotor 58 to constitute a generator 60 together with the outer rotor 58 that is fixed to a right cover 61 fastened to the right semi-crankcase 20R to cover the generator 60.

Figure 3:
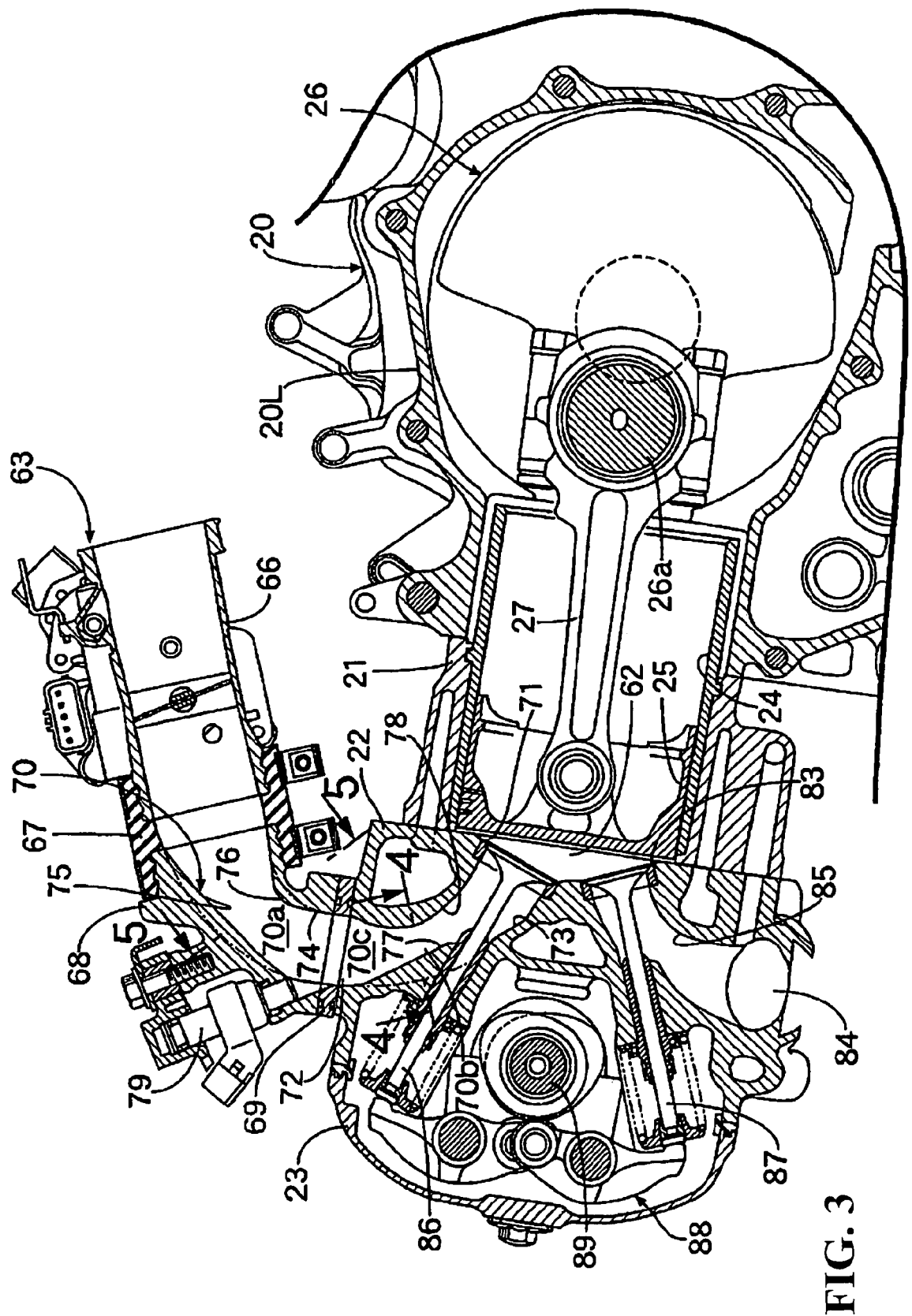
FIG. 3 is an enlarged sectional view taken along the line 3-3 of FIG. 2.

In FIG. 3, the combustion engine 62 opposite to the tip end of the piston 25 is formed between the cylinder block 21 and the cylinder head 22. An induction system 63 for supplying air to the combustion chamber 62 is connected to the upper side wall of the cylinder head 22. The induction system 63 includes an air clear 64 (see FIG. 1) supported by the transmission case 31 and placed above the transmission case 31. A connecting tube 65 (see FIG. 1) includes an upstream end connected to the air cleaner 64, a throttle body 66 connected to a downstream end of the connecting tube 65, and an inlet pipe 68 having an upstream end connected to the throttle body 66 through the connector 67. The downstream end of the inlet pipe 68 is connected to an upper side surface of the cylinder head 22 through an insulator 69.

Figure 4:
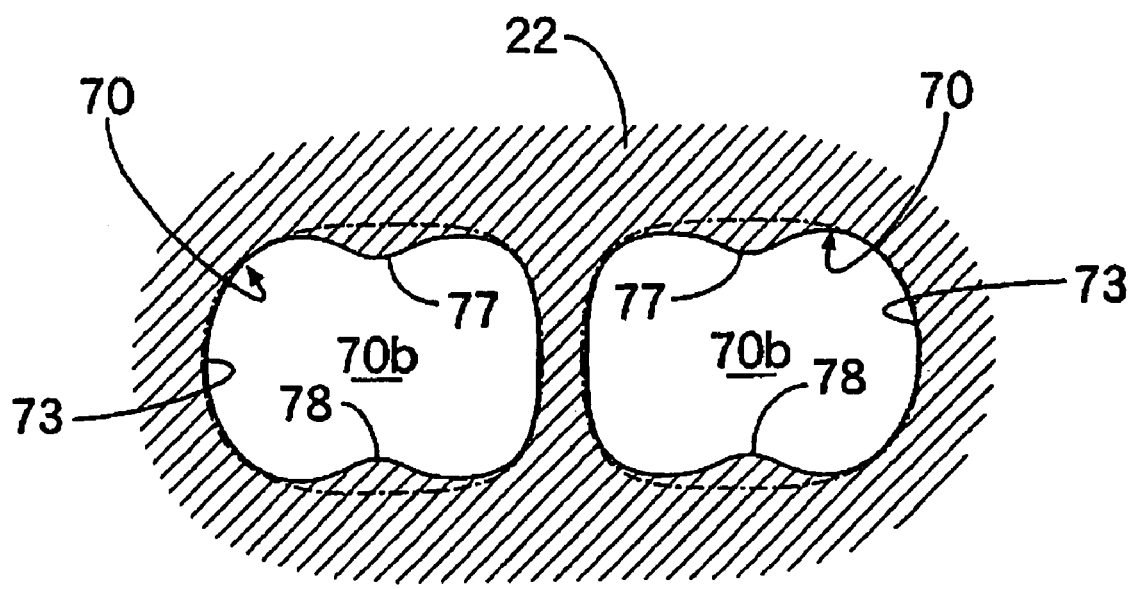
FIG. 4 is an enlarged sectional view taken along the line 4-4 of FIG. 3.

The cylinder head 22 is provided with a pair of intake valve ports 71 that open to the top surface of the combustion chamber 62, a single intake port 72 that opens to the upper side surface of the cylinder head 22, and a pair of branch paths 73 branching off from the intake port 72 and communicating with the intake valve ports 71 as shown in FIG. 4. Further, a path 74 is formed in the inlet pipe 68 and the insulator 69. In addition, a pair of intake paths 70, sharing the path 74 and the intake port 72, is branched off to the branch paths 73 near the combustion chamber 62, and communicate with the intake valve ports 71 extending from the inlet pipe 68 to the cylinder head 22.

In the intake paths 70, a pair of throttle portions 70a and 70b is arranged with an interval in the air flow direction of the intake paths 70 and the expanding portion 70c is provided between the throttle portions 70a and 70b. The throttle portion 70a is shared between the intake paths 70. In addition, the throttle portions 70b are individually formed in each intake path 70.

Further, the intake paths 70 are formed in a substantially U-shape in section as viewed in a projected plan orthogonal to an axial line of a crank shaft 26 and parallel to a cylinder axial line (axial line of the cylinder bore 24). The throttle portions 70a, 70b, are provided in the bent portion of the substantially U-shaped intake paths 70.

Figure 5:
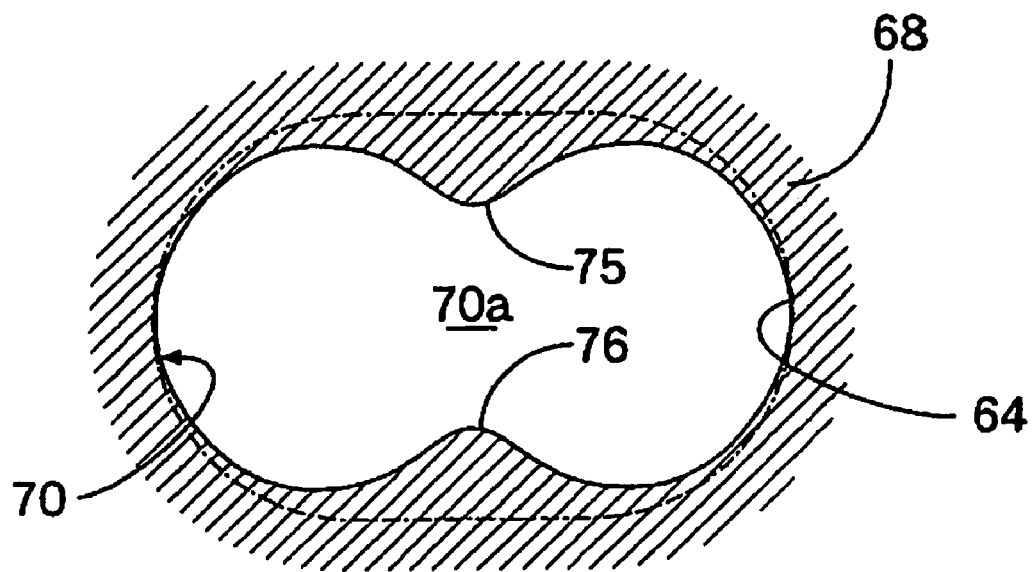
FIG. 5 is an enlarged sectional view taken along the line 5-5 of FIG. 3.

Referring also to FIG. 5, the throttle portion 70a is formed in the inlet pipe 68. The path 74 in the inlet pipe 68 and the insulator 69 basically has an elliptical shape in section with the width direction, that is, the axial line direction of the crank shaft 26 set in the longitudinal direction as indicated by the chained line of FIG. 5. Projections 75 and 76, projecting from opposite walls in a central portion in the width direction of the path 74 to approach each other, are formed in the inlet pipe 68 to thereby obtain the throttle portion 70a.

On the other hand, as shown in FIG. 4, the throttle portions 70b are formed in the branch paths 73 of the cylinder head 22. As indicated by the chained line of FIG. 4, the branch paths 73 basically have an elliptical shape in section with the width direction, that is, the axial line direction of the crank shaft 26 set in the longitudinal direction. Projections 77 and 78, projecting from opposite walls in a central portion in the width direction of the branch paths 73 to approach each other, are formed in the cylinder head 22 to thereby obtain the throttle portions 70b.

The expanding unit 70c is formed in the intake path 70 in accordance with the connection portion between the cylinder head 22 and the inlet pipe 68. The fuel injection valve 79 for injecting a fuel to the expanding unit 70c is attached to the inlet pipe 68.

Further, an exhaust system 82 is connected to the lower side face of the cylinder head 22. The exhaust system 82 is connected to the lower portion of the cylinder head 22 and includes an exhaust pipe 80 (see FIG. 1) extending from the lower right side of the engine main body 19 to the right side of the rear wheel WR. An exhaust muffler 81 (see FIG. 1) is connected to the exhaust pipe 80 and placed on the right side of the rear wheel WR.

Further, the cylinder head 22 is provided with a pair of exhaust valve ports 83 that open to the top surface of the combustion engine 62, a single exhaust port 84 that opens to a lower side face of the cylinder head 22, and a pair of branch paths 85 branched off from the exhaust port 84 and individually communicating with the exhaust valve ports 83. The exhaust system 82 is connected to the lower side face of the cylinder head 22 to communicate with the exhaust port 84.

On the other hand, the cylinder head 22 is provided with a pair of intake valves 86 for closing/opening the intake valve ports 71, and a pair of exhaust valves 87 for opening/closing the exhaust valve ports 83. A valve system 88 for opening/closing the intake valves 86 and exhaust valves 87 is accommodated in a space between the cylinder head 22 and the head cover 23. A cam shaft 89 of the valve system 88 is supported to the cylinder head 22 rotatably about the axial line parallel to the crank shaft 26.

Figure 6:
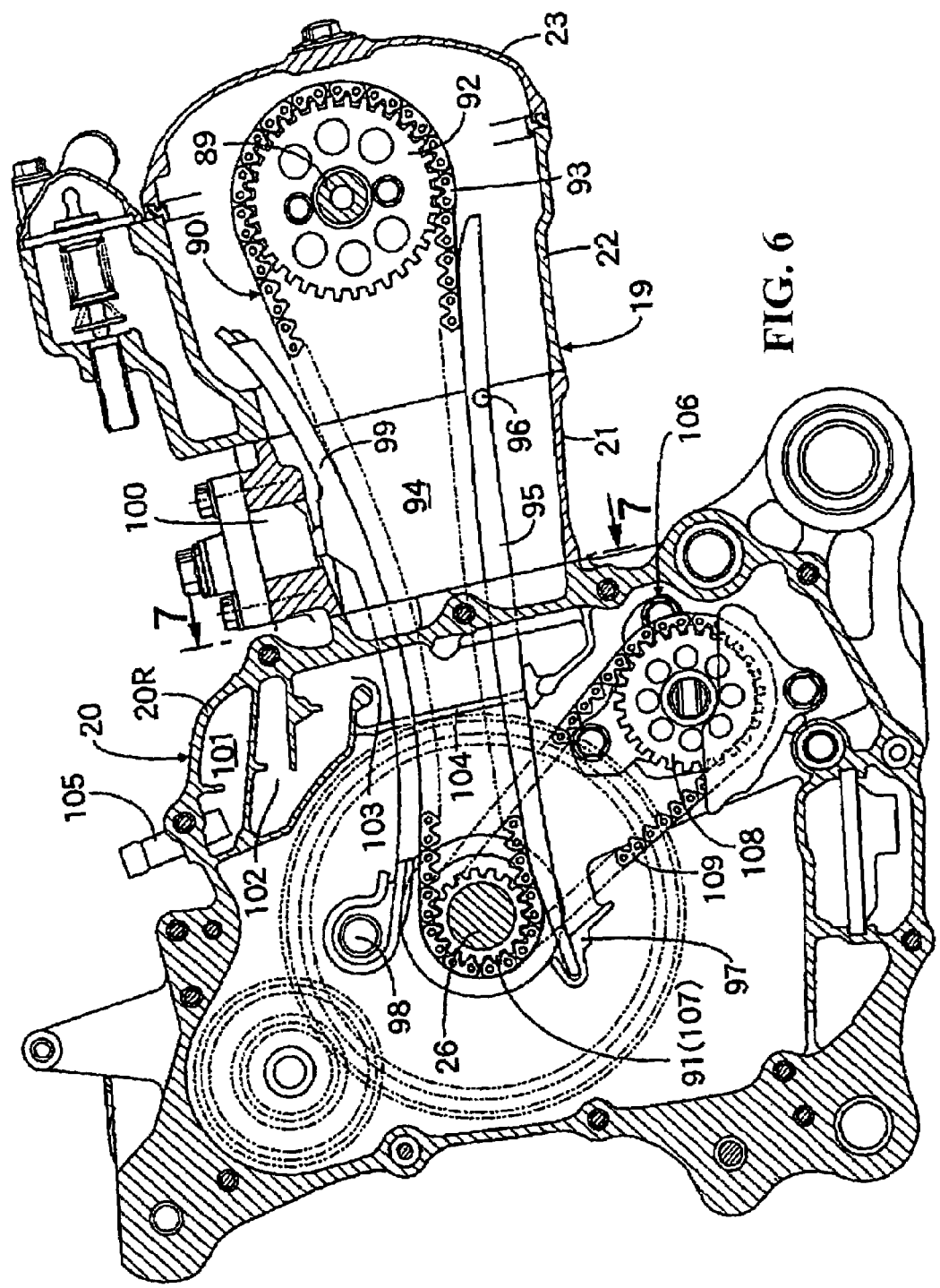
FIG. 6 is an enlarged sectional view taken along the line 6-6 of FIG. 2.

Referring also to FIG. 6, a torque from the crank shaft 26 is transmitted to the cam shaft 89 through a timing transmission mechanism 90 at a reduction gear ratio of 1/2. The timing transmission mechanism 90 includes a cam drive sprocket 91 provided to the crank shaft 26 between the right semi-crankcase 20R and the generator 60, a cam driven sprocket 92 fixed to the cam shaft 89, and an endless cam chain 93 stretched over the sprockets 91 and 92. A cam chain chamber 94 for moving the cam chain 93 extends from the crankcase 20 to the cylinder block 21 and up to the cylinder head 22.

A cam chain guide 95 comes into contact with an outer periphery of the stretched cam chain 93 between the cam drive sprocket 91 and the cam driven sprocket 92. A projection 96 of the cam chain guide 95 formed near the cam driven sprocket 92 is interposed between the cylinder block 21 and the cylinder head 22. An end portion of the cam chain guide 95 on the cam drive sprocket 91 side is fitted and supported to a supporting portion 97 formed in the right semi-crankcase 20R of the crankcase 20.

Further, a chain tensioner 99 comes into contact with an outer periphery of the sagging cam chain 93 between the cam drive sprocket 91 and the cam driven sprocket 92, and the end portion on the cam drive sprocket 91 side is supported to the tensioner rotatably about a spindle 98 provided to the right semi-crankcase 20R. The cylinder block 21 is provided with a tensioner lifter 100 that comes into contact with the chain tensioner 99 from the opposite side of the cam chain 93.

In the right case 60R of the crankcase 20, a breather chamber 101 communicating with an upper portion of the cam chain chamber 94 on the crankcase 20 side is formed. In addition, a breather pipe 105 communicating with the breather chamber 101 is attached to the right semi-crankcase 20R. The breather chamber 101 communicates with an upper portion of the cam chain chamber 94 on the crankcase 20 side through the inlet 103 located below the breather chamber 101. A maze 102 for separating oil mist from a blow-by gas introduced from the inlet 103 is defined in the breather chamber 101.

Figure 7:
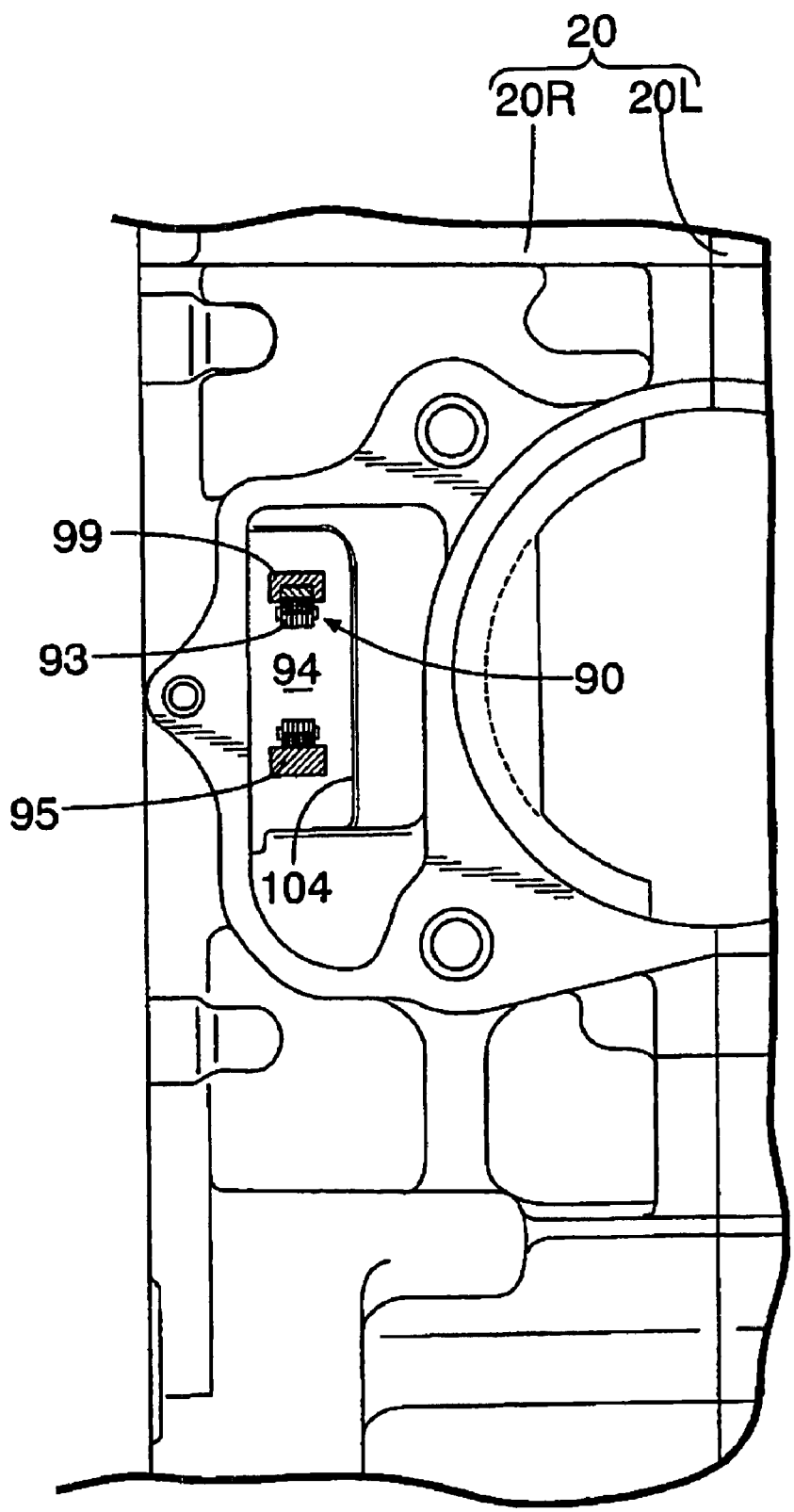
FIG. 7 is an enlarged sectional view taken along the line 7-7 of FIG. 6.

Referring also to FIG. 7, a projecting wall 104 provided at the inlet 103 that opens to the cam chain chamber 94 of the breather chamber 101 and extending orthogonally to the moving direction of the cam chain 93 integrally projects from the right semi-crankcase 20R of the crankcase 20 toward the cam chain 93 side.

Here, a drive sprocket 107 for accommodating and holding an oil pump 106 for pumping oil and driving the oil pump 106 is provided closer to the center portion in the axial direction of the crank shaft 26 than the cam drive sprocket 91 in the crankcase 20. The endless chain 109 is stretched around a driven sprocket 108 provided on the oil pump 106 side and the drive sprocket 107.

Referring back to FIG. 2, a cool air introducing port 110 for cooling the V-belt continuously variable transmission 29 with external air is provided in a portion corresponding to the drive pulley 39 of the outer case 35 in the transmission case 31. Further, a fan 111 for sucking air from the cool air introducing port 110 to the transmission chamber 37 is integrally formed on the outer edge surface of the fixed semi-pulley 43 of the drive pulley 39.

An outside air introducing duct 112 for introducing the outside air to the cool air introducing port 110 is attached to the outer case 35 of the transmission case 31. In addition, a path formation portion 112a is connected to the air cleaner 64 to introduce the outside air to the air cleaner 64, as shown in FIG. 1, is integrally formed in the outside air introducing duct 112.

The outside air introducing duct 112 has a cover 113 that surrounds the cool air introducing port 110 and comes into contact with the outer case 35, and a filter element 115 is endlessly wound around a support frame 114 integrally formed in the cover 113. Thus, an inner area of the outside air introducing duct 112 is segmented into a cleaning chamber 116 defined in the filter element 115 and communicating with the cool air introducing port 110 and an uncleaning chamber 117 defined outside the filter element 115. The uncleaning chamber 117 is open to the outside.

The following is a description of the operations of the embodiment. The breather chamber 101 is formed in the right semi-crankcase 20R of the crankcase 20. The breather chamber communicates with the upper portion of the cam chain chamber 94 on the crankcase 20 side, the cam chain chamber extending from the crankcase 20 to the cylinder block 21 and up to the cylinder head 22 to stretch the cam chain 93. The projecting wall 104 is formed at the inlet 103 that opens to the cam chain chamber 94 of the breather chamber 101. The projecting wall 140 extends orthogonally to the movement direction of the cam chain 93 in the cam chain chamber 94 and is provided to the right semi-crankcase 20R of the crankcase 20 to project toward the cam chain 93 side.

Accordingly, at the time of stretching the cam chain 93 under such conditions that the axial line of the crank shaft 26 is in the vertical direction, the cam chain 93 can be placed and held on the projecting wall 104 near the cam drive sprocket 91. As a result, the assembly of the cam chain 93 is facilitated, and assembly efficiency is enhanced. Moreover, the projecting wall 104 also functions as a barrier against a blow-by gas introduced to the breather chamber 101 from the crankcase 20. Thus, an increase in separating oil mist from the blow-by gas occurs.

Further, in the crankcase 20, the oil pump 106 for pumping oil is accommodated and fixed, the drive sprocket 107 for driving the oil pump 106 is provided closer to the central portion in the axial direction of the crank shaft 26 than the cam drive sprocket 91. Even if the drive sprocket 107 is placed inside the cam drive sprocket 91, it is possible to prevent the cam chain 93 from reaching the drive sprocket 107 side with the projecting wall 104. Thus, assembly efficiency is improved. In addition, the projecting wall 104 effectively prevents leakage of oil from the drive sprocket 107 to the breather chamber 101.

Further, the intake paths 70 communicating with the intake valve ports 71 provided in the cylinder head 22 to open to the top surface of the combustion chamber 62 extend from the inlet pipe 68 to the cylinder head 22. In the intake paths 70, a pair of throttle portions 70a, 70b are formed that are arranged with an interval in an air flow direction of the intake paths 70 and an expanding portion 70c positioned between the throttle portions 70a, 70b.

Accordingly, a cross-sectional area of the intake paths 70 is sequentially changed such as reduced, expanded, reduced, and expanded in the air flow direction. Thus, it is possible to increase an intake flow rate due to a reduction in the cross-sectional area and increase an intake air amount due to an expansion in the cross-sectional area in a balanced manner. As a result, filling efficiency is improved to increase power.

Further, the fuel injection valve 79 for injecting fuel to the expanding portion 70c is provided to the inlet pipe 68. Thus, fuel is injected from the fuel injection valve 79 to the expanding portion 70c of the intake paths 70, so it is possible to suppress change in the intake air flow rate due to a nozzle arrangement of the fuel injection valve 79 as much as possible.

Further, since the expanding unit 70c corresponds to the connection portion between the cylinder head 22 and the inlet pipe 68 connected to the cylinder head 22, even if the cylinder head 22 and the inlet pipe 68 are separate members, a connection port diameter can be set relatively large, and parts can be easily processed and assembled.

Further, the throttle portions 70a, 70b, are provided to a bent portion of the intake paths 70 formed in substantially a U-shape in section as viewed in a projected plan orthogonal to an axial line of the crank shaft 26 and parallel to a cylinder axial line. Thus, the intake paths 70 can be made compact and a cross-sectional area of the intake paths 70 can be largely changed by arranging the throttle portions 70a, 70b, in the bent portion.

The embodiment of the present invention is described above, but the present invention is not limited to the above embodiment, and various modifications and changes can be made without departing from the scope of the invention.

For example, the above embodiment describes the example where the cylinder head 22 and the inlet pipe 68 are separate members, but the present invention is applicable to an internal combustion engine where the cylinder head 22 and the inlet pipe 68 are integrated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An internal combustion engine, comprising:
    a combustion chamber formed between a cylinder block and a cylinder head opposite to a top portion of a piston slidably fitted in the cylinder block; and
    an intake path extending from an inlet pipe separately or integrally connected to the cylinder head and communicating with an intake valve port that opens to a top surface of the combustion chamber to be opened/closed with an intake valve;
    wherein the intake path is provided with a pair of throttle portions arranged with an interval in an air flow direction of the intake path and an expanding portion positioned between the throttle portions,
    wherein a throttle body is arranged upstream of the pair of throttle portions, and
    wherein the throttle portions are provided to a bent portion of the intake path formed in a substantially U-shape in section as viewed in a projected plan orthogonal to an axial line of a crank shaft and parallel to a cylinder axial line.

2. The internal combustion engine according to claim 1, and further including a fuel injection valve attached to the cylinder head or the inlet pipe, the fuel injection valve injecting a fuel to the expanding portion.

3. The internal combustion engine according to claim 2, wherein the expanding portion corresponds to a connection portion between the cylinder head and the inlet pipe separate from the cylinder head.

4. The internal combustion engine according to claim 1, wherein the expanding portion corresponds to a connection portion between the cylinder head and the inlet pipe separate from the cylinder head.

5. An internal combustion engine, comprising:
- a combustion chamber formed between a cylinder block and a cylinder head opposite to a top portion of a piston slidably fitted in the cylinder block; and
- an intake path extending from an inlet pipe separately or integrally connected to the cylinder head and communicating with an intake valve port that opens to a top surface of the combustion chamber to be opened/closed with an intake valve;
- the intake path is provided with a pair of throttle portions arranged with an interval in an air flow direction of the intake path and an expanding portion positioned between the throttle portions, wherein the throttle portions are provided to a bent portion of the intake path formed in a substantially U-shape in section as viewed in a projected plan orthogonal to an axial line of a crank shaft and parallel to a cylinder axial line.

6. An internal combustion engine, comprising:
- a piston slidably fitted in a cylinder block, a top portion of said piston together with said cylinder block and a cylinder head forming a combustion chamber;
- an intake path extending from an inlet pipe separately or integrally connected to the cylinder head and communicating with an intake valve port operatively connected to the top surface of the combustion chamber to be opened/closed with an intake valve;
- a pair of throttle portions arranged with an interval in an air flow direction of the intake path; and
- an expanding portion positioned between the throttle portions,
- wherein a throttle valve of a throttle body is arranged upstream of the pair of throttle portions, and
- wherein the throttle portions are provided to a bent portion of the intake path formed in a substantially U-shape in section as viewed in a projected plan orthogonal to an axial line of a crank shaft and parallel to a cylinder axial line.

7. The internal combustion engine according to claim 6, and further including a fuel injection valve attached to the cylinder head or the inlet pipe, the fuel injection valve injecting a fuel to the expanding portion.

8. The internal combustion engine according to claim 7, wherein the expanding portion corresponds to a connection portion between the cylinder head and the inlet pipe separate from the cylinder head.

9. The internal combustion engine according to claim 6, wherein the expanding portion corresponds to a connection portion between the cylinder head and the inlet pipe separate from the cylinder head.

10. An internal combustion engine, comprising:
- a combustion chamber formed between a cylinder block and a cylinder head opposite to a top portion of a piston slidably fitted in the cylinder block; and
- an intake path extending from an inlet pipe separately or integrally connected to the cylinder head and communicating with an intake valve port that opens to a top surface of the combustion chamber to be opened/closed with an intake valve;
- wherein the intake path is provided with a pair of throttle portions arranged with an interval in an air flow direction of the intake path and an expanding portion positioned between the throttle portions, and
- wherein a throttle body is arranged upstream of the pair of throttle portions, wherein a first throttle portion has a single path and a pair of projections extending inwardly and the second throttle portion has a pair of paths, each second throttle portion path having a pair of projections.

11. An internal combustion engine, comprising:
- a piston slidably fitted in a cylinder block, a top portion of said piston together with said cylinder block and a cylinder head forming a combustion chamber;
- an intake path extending from an inlet pipe separately or integrally connected to the cylinder head and communicating with an intake valve port operatively connected to the top surface of the combustion chamber to be opened/closed with an intake valve;
- a pair of throttle portions arranged with an interval in an air flow direction of the intake path; and
- an expanding portion positioned between the throttle portions,
- wherein a throttle valve of a throttle body is arranged upstream of the pair of throttle portions, and wherein a first throttle portion has a single path and a pair of projections extending inwardly and the second throttle portion has a pair of paths, each second throttle portion path having a pair of projections.

* * * * *